United States Patent
Kim et al.

(10) Patent No.: US 11,597,125 B2
(45) Date of Patent: Mar. 7, 2023

(54) DIP-COATING METHOD USING SUPPORTING LIQUID, AND FABRICATING METHOD OF HOLLOW TUBE USING THE SAME

(71) Applicants: POSTECH Research and Business Development Foundation, Pohang-si (KR); Kyungpook National University Industry—Academic Cooperation Foundation, Daegu (KR); KYUNGPOOK NATIONAL UNIVERSITY HOSPITAL, Daegu (KR)

(72) Inventors: Joonwon Kim, Pohang-si (KR); Seong Hyeon Kim, Pohang-si (KR); Dong-Hun Kang, Daegu (KR); Jaechan Park, Daegu (KR); Jongkyeong Lim, Yeongju-si (KR); A-Reum Kim, Yeongcheon-si (KR)

(73) Assignees: POSTECH RESEARCH AND BUSINESS DEVELOPMENT FOUNDATION, Pohang-si (KR); KYUNGPOOK NATIONAL UNIVERSITY INDUSTRY-ACADEMIC COOPERATION FOUNDATION, Daegu (KR); KYUNGPOOK NATIONAL UNIVERSITY HOSPITAL, Daegu (KR)

( * ) Notice: Subject to any disclaimer, the term of this patent is extended or adjusted under 35 U.S.C. 154(b) by 573 days.

(21) Appl. No.: 16/861,631

(22) Filed: Apr. 29, 2020

(65) Prior Publication Data
US 2020/0346375 A1 Nov. 5, 2020

(30) Foreign Application Priority Data
May 2, 2019 (KR) .......... 10-2019-0051701

(51) Int. Cl.
 *B29C 41/14* (2006.01)
 *B29C 35/04* (2006.01)
 (Continued)

(52) U.S. Cl.
 CPC ............ *B29C 41/14* (2013.01); *B29C 35/041* (2013.01); *B29C 41/42* (2013.01); *B29C 41/50* (2013.01);
 (Continued)

(58) Field of Classification Search
 CPC ..... B29C 41/14; B29C 41/50; B29C 35/0244; B29C 35/041
 See application file for complete search history.

(56) References Cited

U.S. PATENT DOCUMENTS 1,831,212 A * 11/1931 Voss et al. .......... B29C 37/0017
   264/307
5,725,667 A 3/1998 Petropoulos et al.
 (Continued)

FOREIGN PATENT DOCUMENTS

JP H10-407 1/1998
JP 2008-012396 1/2008
 (Continued)

OTHER PUBLICATIONS

Rajasubramanian, Ganesh, et al. "Fabrication of resorbable microporous intravascular stents for gene therapy applications." ASAIO journal 40.3 (Jul. 1994): M584-M589. (Year: 1994).*
 (Continued)

Primary Examiner — Benjamin A Schiffman
(74) Attorney, Agent, or Firm — Lex IP Meister, PLLC

(57) ABSTRACT

Disclosed is a dip-coating method as a method of coating an outer surface of a target mold including steps of: preparing and putting a supporting liquid in a container; applying a coating material to the target mold; dipping the target mold
 (Continued)

in the supporting liquid; shaking the target mold surrounded by the coating material in the supporting liquid; curing the coating material surrounding the target mold in the supporting liquid; and taking out the coated target mold from the supporting liquid.

20 Claims, 22 Drawing Sheets

(51) Int. Cl.
    *B29C 41/42*     (2006.01)
    *B29C 41/50*     (2006.01)
    *B29L 23/00*     (2006.01)
    *B29L 31/00*     (2006.01)

(52) U.S. Cl.
    CPC ..... *B29L 2023/00* (2013.01); *B29L 2023/001* (2013.01); *B29L 2023/22* (2013.01); *B29L 2031/7532* (2013.01); *B29L 2031/7534* (2013.01)

(56) References Cited

U.S. PATENT DOCUMENTS

| | | | |
|---|---|---|---|
| 6,497,916 B1 | 12/2002 | Taylor et al. | |
| 6,569,375 B1 * | 5/2003 | McGlothlin et al. | C08J 5/02 264/306 |
| 8,227,016 B2 | 7/2012 | Thornton et al. | |
| 2008/0040835 A1 * | 2/2008 | Miyamoto et al. | B29C 41/22 2/169 |
| 2016/0130690 A1 * | 5/2016 | Winn et al. | B29C 41/003 427/387 |
| 2017/0148356 A1 | 5/2017 | Black et al. | |
| 2018/0333902 A1 * | 11/2018 | McGlothlin et al. | A61B 42/10 |

FOREIGN PATENT DOCUMENTS

| | | |
|---|---|---|
| JP | 4330557 | 9/2009 |
| JP | 2011-525137 | 9/2011 |
| JP | 2017-527322 | 9/2017 |
| KR | 10-2018-0083919 | 7/2018 |

OTHER PUBLICATIONS

Ceratti, Davide R., et al. "A new dip coating method to obtain large-surface coatings with a minimum of solution." Advanced Materials 27.34 (Jul. 21, 2015): 4958-4962. (Year: 2015).*

Lim, Jongkyeong, et al. "A new dip coating method using supporting liquid for forming uniformly thick layers on serpentine 3D substrates." Advanced Materials Interfaces 6.24 (Nov. 12, 2019): 1901485. (Year: 2019).*

Jaewook Nam, "Roll-To Roll Coating Process Overview and Future Tasks", News & Information for Chemical Engineers, vol. 28, No. 5, 2010.

* cited by examiner

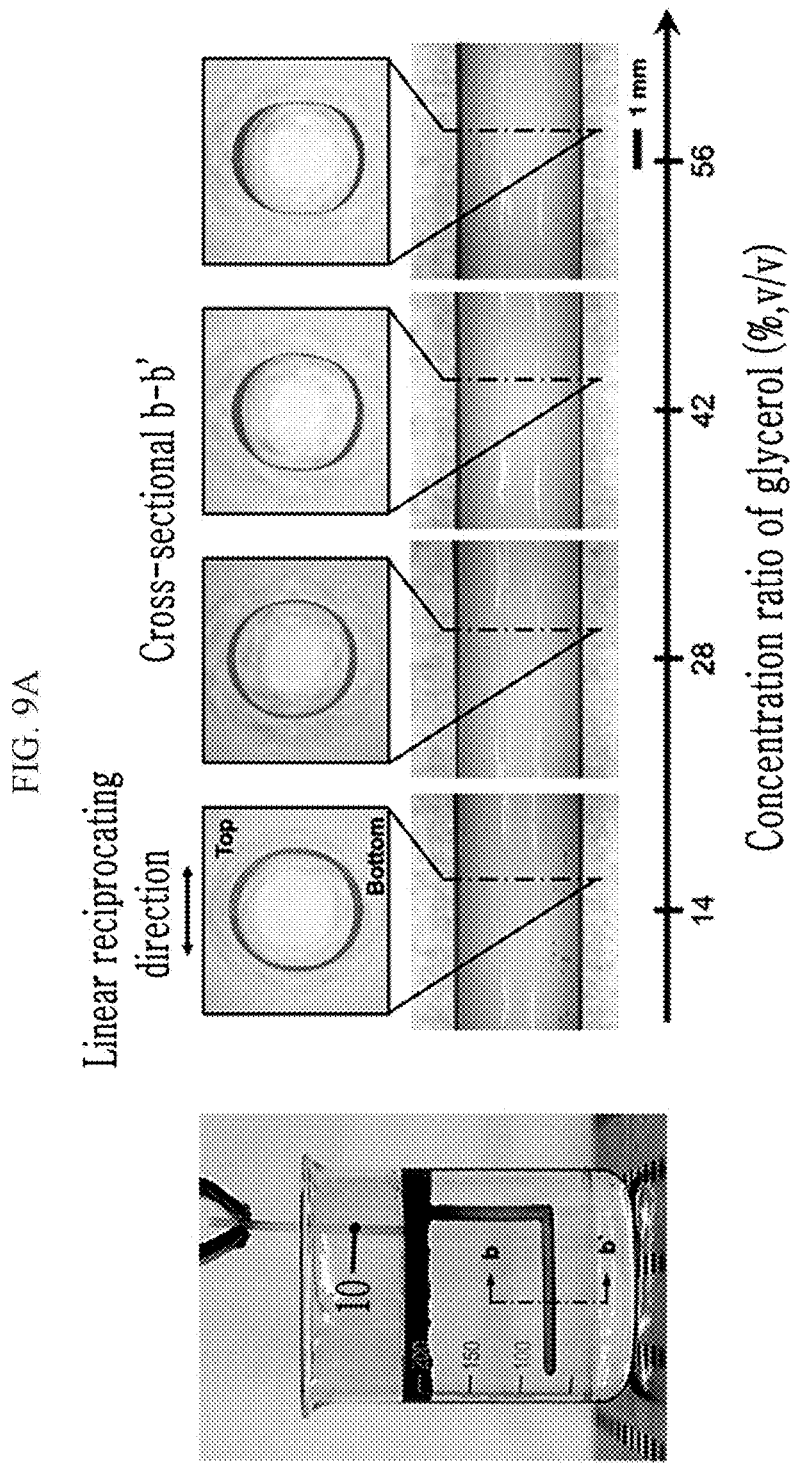

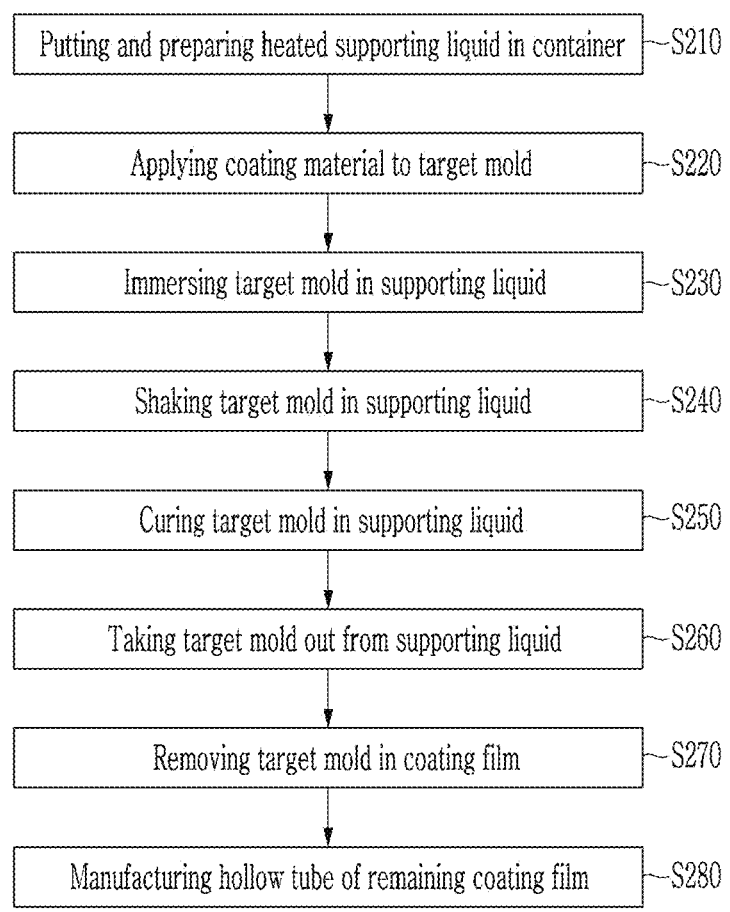

DIP-COATING METHOD USING SUPPORTING LIQUID, AND FABRICATING METHOD OF HOLLOW TUBE USING THE SAME

CROSS-REFERENCE TO RELATED APPLICATION

This application claims priority to and the benefit of Korean Patent Application No. 10-2019-0051701 filed in the Korean Intellectual Property Office on May 2, 2019, the entire contents of which are incorporated herein by reference.

BACKGROUND OF THE INVENTION

(a) Field of the Invention

The present invention relates to a dip-coating method and apparatus. More particularly, the present invention relates to a dip-coating method of dipping a coating target in a liquid including a coating material to be coated and a dip-coating apparatus therefor. Also, the present invention relates to a method for fabricating a hollow tube by using the dip-coating method and apparatus.

(b) Description of the Related Art

Coating is a technology for covering a surface of a solid mold with a material of a liquid or semi-liquid state and is used in aesthetic or functional aspects, and various coating technologies have been developed depending on a purpose and material. For example, methods for forming a liquid coating layer include dip-coating, roller coating, spray coating, and flow coating.

The dip-coating method is a method in which a target is immersed in a coating liquid and is pulled up and then dried after preventing the excess coating liquid from flowing, and this is also called dipping. This method is simple to operate and may be applied to coat the entire surface of a target having a complex shape, small parts, and parts having a three-dimensional design. However, as a drawback, the thickness of the coating film is not uniform, and the coating material is easily aggregated in the lower part.

In a typical dip-coating method performed in air, the thickness and uniformity of the coated film are determined according to characteristics (curing rate, surface tension, viscosity, etc.) of the coating solution. When coating to form a film with a macroscopic thickness, in a case in which the curing rate is slow, the uncured solution flows in the direction of gravity, which may cause a difference in the thickness between the upper and lower ends of the film. In addition, in the case of the three-dimensional mold, a phenomenon in which the coating solution is formed in a portion where a curve is severe may occur.

Therefore, there is a need for a method of uniformly coating the film having the macroscopic thickness regardless of the shape of the mold.

The above information disclosed in this Background section is only for enhancement of understanding of the background of the invention, and therefore it may contain information that does not form the prior art that is already known in this country to a person of ordinary skill in the art.

SUMMARY OF THE INVENTION

One aspect of the present invention is to provide a dip-coating method capable of forming a coating film of a uniform thickness by offsetting the effect of gravity acting on a coating liquid applied to a target mold by using a supporting liquid.

Another aspect of the present invention is to provide a dip-coating apparatus capable of performing the dip-coating method described above.

A further aspect of the present invention is to provide a method for fabricating a hollow tube by utilizing the dip-coating method using the supporting liquid.

A dip-coating method as a method for coating an outer surface of a target mold according to an exemplary embodiment of the present invention includes steps of: preparing and putting a supporting liquid in a container; applying a coating material to the target mold; dipping the target mold in the supporting liquid; shaking the target mold surrounded by the coating material in the supporting liquid; curing the coating material surrounding the target mold in the supporting liquid; and taking out the coated target mold from the supporting liquid.

The preparing and putting the supporting liquid in the container may further include pouring the coating material onto the supporting liquid, and the dipping the target mold in the supporting liquid may further include immersing the target mold in the supporting liquid through the coating material.

The applying the coating material to the target mold may further include preparing and putting the coating material in a separate container from the supporting liquid, immersing the target mold in the coating material and taking the target mold out, and then again immersing the target mold in the supporting liquid.

The supporting liquid may be formed of a material that does not react with or is not mixed with the coating material.

A density of the supporting liquid may be equal to or larger than a density of the coating material.

An interface tension between the supporting liquid and the coating material may be 5 mN/m or more and 30 mN/m or less.

The supporting liquid includes water, glycerol, and a surfactant.

The dip-coating method of the present exemplary embodiment may further include vibrating the target mold by using a 3-axis linear stage to remove the coating material formed at a portion.

The dip-coating method of the present exemplary embodiment may further include rotating the target mold to remove the coating material formed at the portion.

The curing the coating material surrounding the target mold in the supporting liquid may include applying heat to the coating material to be cured.

The curing the coating material surrounding the target mold in the supporting liquid may include irradiating light to the coating material to be cured.

A fabricating method of a hollow tube according to another exemplary embodiment of the present invention includes steps of: preparing the coated target mold by using the dip-coating method described above; removing the target mold in the coating film; and manufacturing a hollow tube with the remaining coating film.

According to the dip-coating method according to an exemplary embodiment of the present invention, the effect of gravity acting on the coating liquid applied to the target mold may be offset by using the supporting liquid, thereby forming a coating film of a uniform thickness. According to the fabricating method of the hollow tube according to another exemplary embodiment of the present invention, the hollow tube having the uniform thickness may be manufactured by utilizing the dip-coating method using the supporting liquid.

BRIEF DESCRIPTION OF THE DRAWINGS

FIG. 9A shows one example of a shape of a coating film according to a concentration ratio of glycerol to determine a supporting liquid used in a dip-coating method according to the present exemplary embodiment.

FIG. 11 is a flowchart showing a method for fabricating a hollow tube by using a dip-coating method according to another exemplary embodiment of the present invention.

DETAILED DESCRIPTION OF THE EMBODIMENTS

Figure 1:
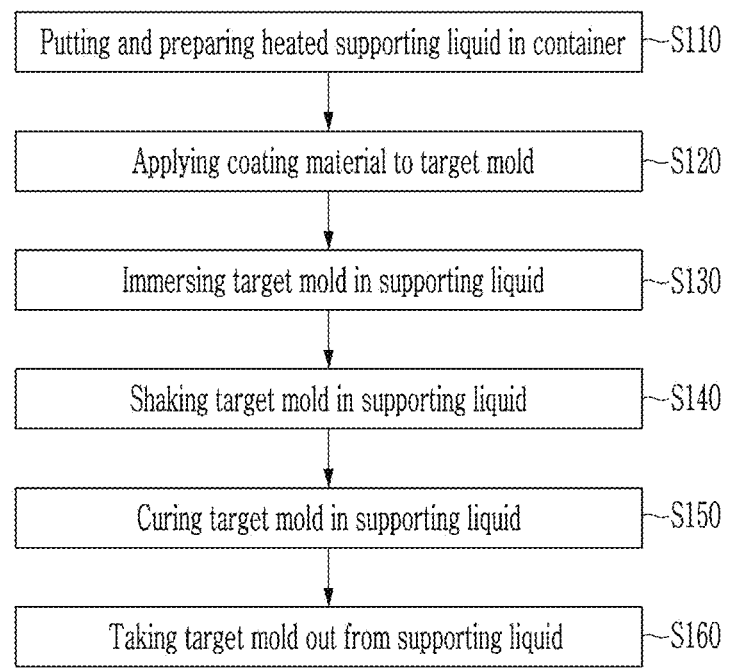
FIG. 1 is a flowchart showing a dip-coating method according to an exemplary embodiment of the present invention.

Hereinafter, the present invention will be described more fully with reference to the accompanying drawings, in which exemplary embodiments of the invention are shown. The drawings and description are to be regarded as illustrative in nature and not restrictive. Like reference numerals designate like elements throughout the specification.

Figure 2:
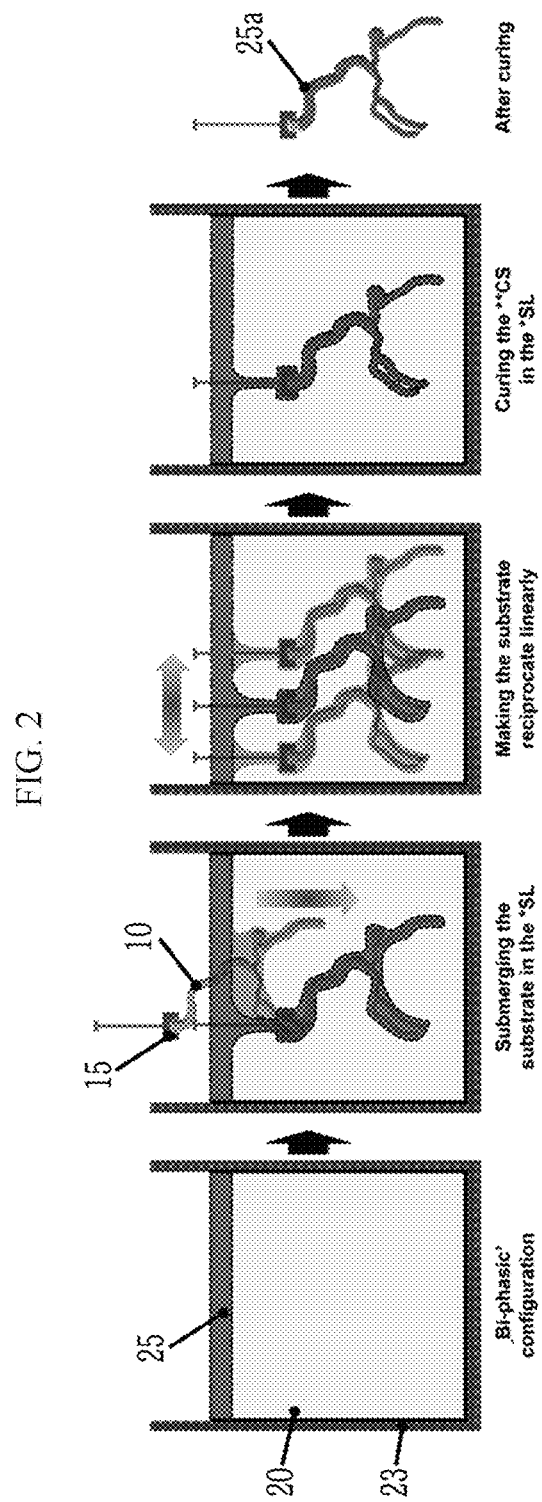
FIG. 2 is a process diagram showing a dip-coating method in chronological order according to an exemplary embodiment of the present invention.

FIG. 1 is a flowchart showing a dip-coating method according to an exemplary embodiment of the present invention, and FIG. 2 is a process diagram showing a dip-coating method in chronological order according to an exemplary embodiment of the present invention.

Referring to FIG. 1 and FIG. 2, in order to perform the dip-coating method according to the present exemplary embodiment, a supporting liquid 20 is prepared and put in a container 23 (S110). At this time, the supporting liquid 20 in a heated state may be prepared by putting it in a container 23, or alternatively, the supporting liquid 20 may be heated after being put in the container 23. The container 23 may be a beaker, and a heater may be provided at the bottom or around the container 23 to heat the supporting liquid 20 contained in the container 23. As another example, a light irradiator is provided around the container 23 to irradiate a coating material 25 contained in the container 23. The supporting liquid 20 may include water, glycerol, and a surfactant. In addition to glycerol, it is possible to use any material that does not react with or mix with the coating material 25 while increasing a density of the supporting liquid 20. As the surfactant, Tween® 20, Tween® 80, Triton™ X-100, etc. may be used.

Figure 3A:
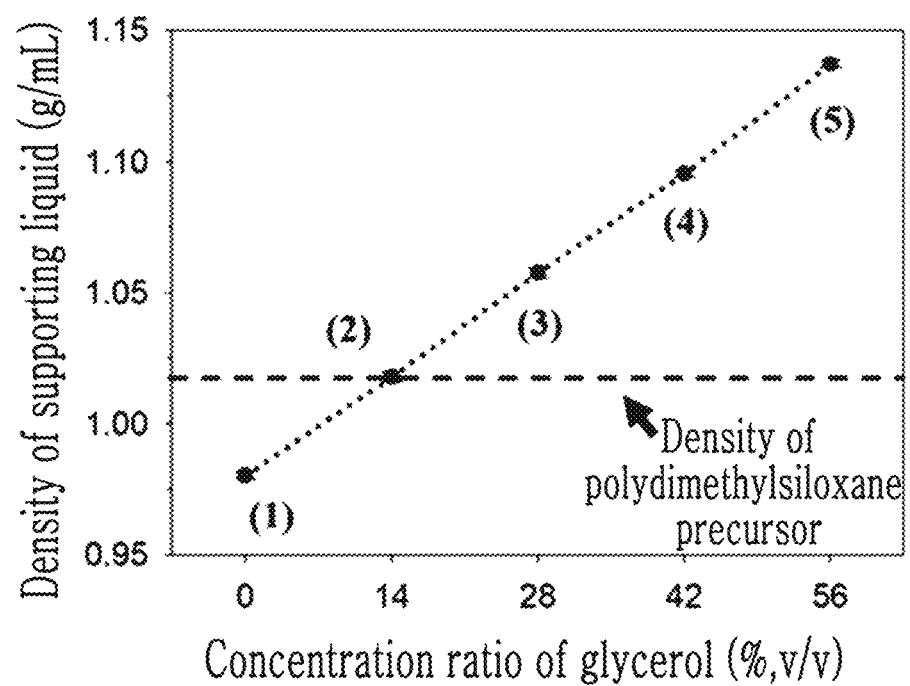
FIG. 3A is a graph showing a relationship of a concentration ratio of glycerol and a density of a supporting liquid.
Figure 3B:
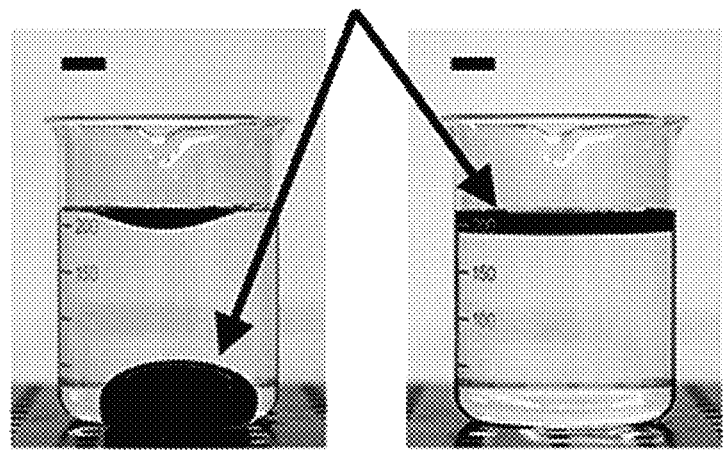
FIG. 3B is a diagram showing a result of comparing a change of an arrangement of a coating solution and a supporting liquid according to a concentration ratio of glycerol.
Figure 3C:
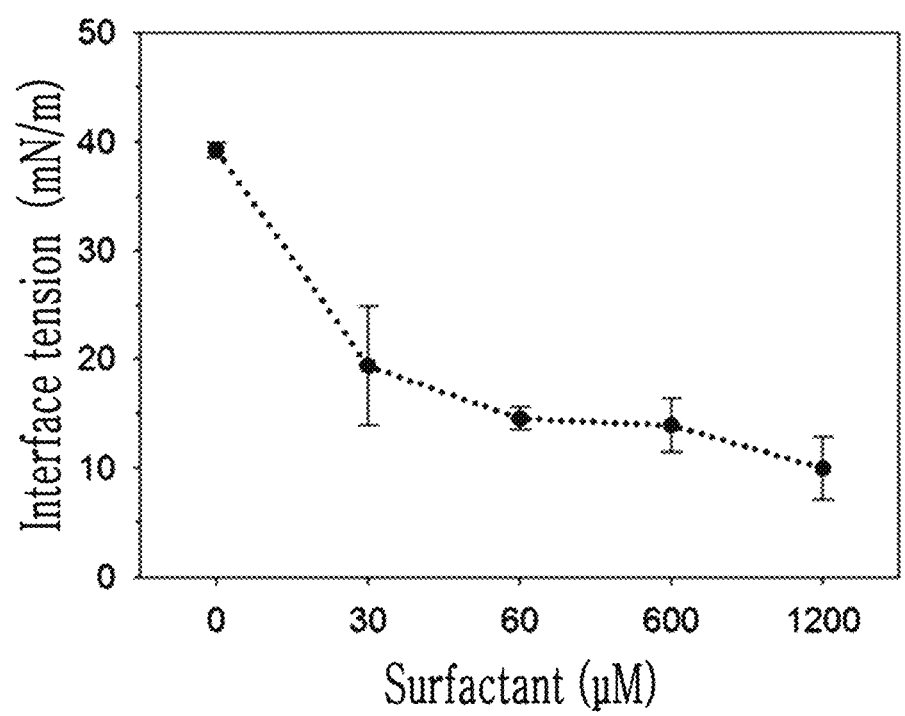
FIG. 3C is a graph showing a relationship of a concentration ratio of a surfactant and interface tension between a supporting liquid and a coating material.

FIG. 3A is a graph showing a relationship of a concentration ratio of glycerol and a density of a supporting liquid, FIG. 3B is a diagram showing a result of comparing a change of an arrangement of a coating solution and a supporting liquid according to a concentration ratio of glycerol, and FIG. 3C is a graph showing a relationship of a concentration ratio of a surfactant and interface tension between a supporting liquid and a coating material.

Referring to FIGS. 3A-3C, as the concentration ratio of glycerol increases, the density of the supporting liquid 20 increases (See FIG. 3A). In addition, as the concentration ratio of the surfactant increases, the interface tension decreases, and when the concentration ratio exceeds a certain level, the change of the interface tension becomes negligible (See FIG. 3C).

In the step of preparing and putting the supporting liquid 20 in the container 23, the coating material 25 may be poured onto the supporting liquid 20 to be prepared. The supporting liquid 20 may be made of a material that does not mix with the coating material 25, and its density is equal to or at least slightly larger than the density of the coating material 25. Therefore, the supporting liquid 20 is disposed under the coating material 25 in the container 23 (See FIG. 3B). The interface tension between the supporting liquid 20 and the coating material 25 may be maintained between 5 mN/m or more and 30 mN/m or less. Therefore, the capillary pressure acting on the coating material 25 has a suitable value to form the coating film of the uniform thickness. When the interface tension is less than 5 mN/m, it is difficult to control the shape of the coating material surrounding the target mold in the step of shaking the target mold surrounded by the coating material in the supporting liquid. When the interface tension exceeds 30 mN/m, in a step of curing the coating material surrounding the target mold in the supporting liquid, the capillary pressure increases such that more coating material is formed on a portion where bending is severe in the target mold, resulting in non-uniformity. Alternatively, the coating material 25 may be dipped and prepared in a different container from that of the supporting liquid 20.

The coating material 25 should not mix or react with the supporting liquid 20, and should have the same density as or at least slightly lower than that of the supporting liquid 20.

As the coating material 25, for example, polydimethylsiloxane (PDMS), Ecoflex™, DragonSkin™, etc. may be used.

The coating material may be a thermally curable material or a photocurable material. Therefore, when curing the coating material made of the thermally curable material, heat is applied, while when curing the coating material made of the photo curable material, light is irradiated. As the thermally curable coating material, for example, polydimethylsiloxane (PDMS), Ecoflex™, Dragon Skin™, etc. may be used, and as the photocurable coating material, photocurable polydimethylsiloxane may be used, and for example, in the case of the photocurable polydimethylsiloxane, the curing is possible by using light of an ultraviolet ray region (e.g., a 365 nm wavelength).

Next, the coating material 25 is coated on a target mold 10 (S120). Then, the target mold 10 is immersed in the supporting liquid 20 (S130).

When the coating material 25 and the supporting liquid 20 are contained in one container 23, the coating material 25 may be coated by dipping the target mold 10 into the supporting liquid 20.

Alternatively, when preparing the coating material 25 in a separate container from that of the supporting liquid 20, the target mold 10 may be immersed in the coating material 25 to be coated. That is, the target mold 10 may be immersed in the coating material 25 contained in the separate container, be taken out at a constant speed, and then be immersed again in the supporting liquid 20.

The target mold 10 may be a mold of a three-dimensional shape. The target mold 10 of the three-dimensional shape, for example, may be an artificial blood vessel model mold. The target mold 10 of the three-dimensional shape may be made by using a 3D printer for example. The material forming the target mold 10, for example, acrylonitrile butadiene styrene (ABS) polymer, polylactic acid (PLA), etc. may be used. Also, the coating material 25 may have higher wettability with the target mold 10 than the supporting liquid 20. That is, a contact angle of the coating material 25 for the target mold 10 may be relatively lower than the contact angle of the supporting liquid 20 thereto.

As shown in FIG. 2, In the process of the immersion, the coating material 25 surrounds the target mold 10 while the target mold 10 is first in contact with the coating material 25 disposed at the top within the container 23. The target mold 10 surrounded by the coating material 25 continues to be immersed in the supporting liquid 20, but the target mold having the higher wettability with the coating material 25 than the supporting liquid 20 is still surrounded by the coating material 25 within the supporting liquid 20.

Figure 4A:
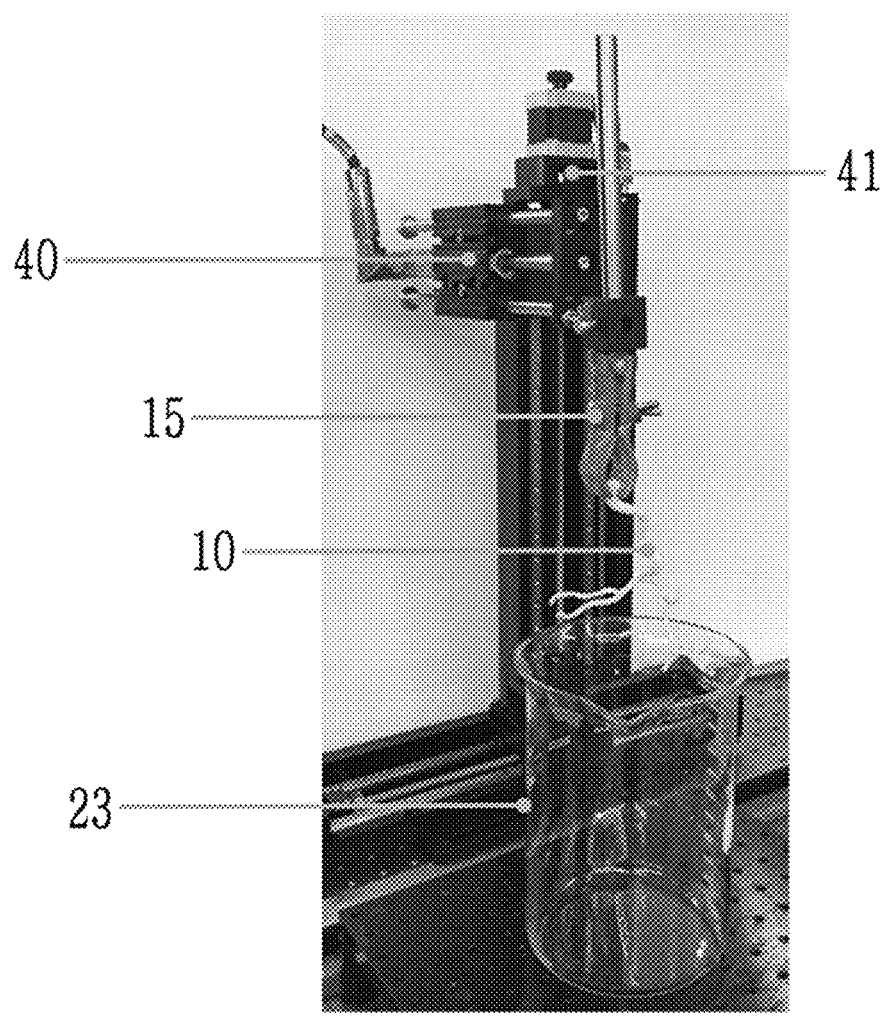
FIG. 4A shows an image of an experimental apparatus equipped with a clamp, a 3-axis linear reciprocating stage, a Z-axis stage, etc.
Figure 4B:
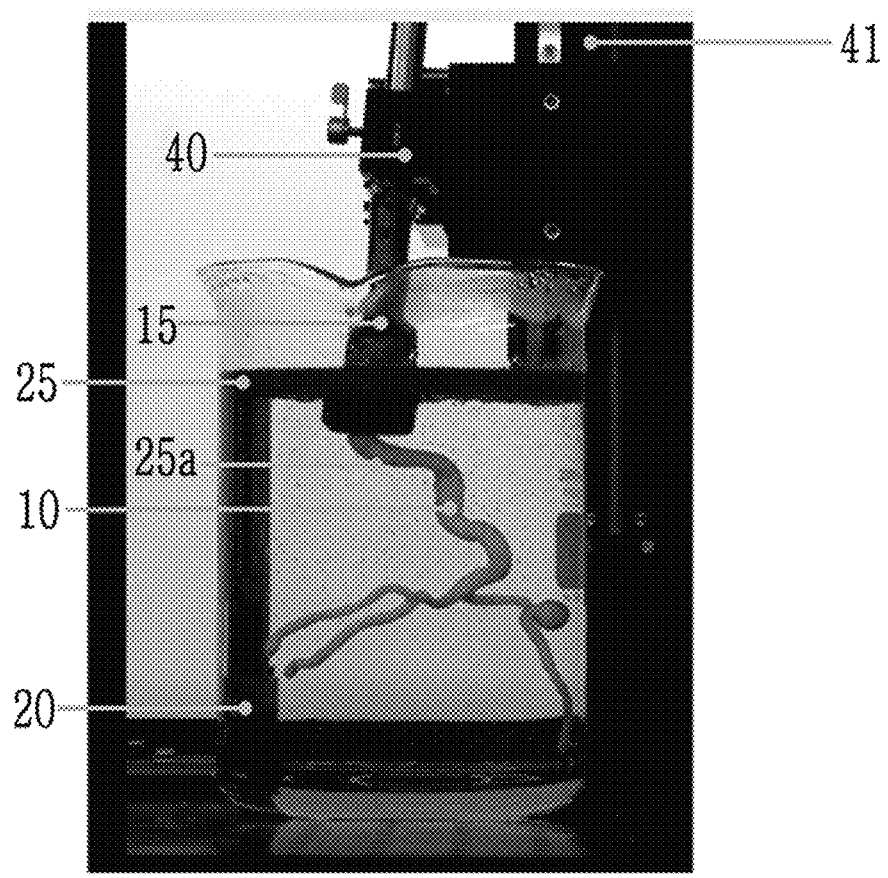
FIG. 4B is an image of a target mold being coated in a supporting liquid.

FIG. 4A is an image showing an experimental apparatus equipped with a clamp, a 3-axis linear reciprocating stage, a Z-axis stage, etc., and FIG. 4B is an image of a target mold being coated in a supporting liquid.

Referring to FIG. 4A, during the process of the immersion, the target mold 10 may be fixed by a clamp 15 to support the target mold 10. Also, a z-axis stage 41 connected to the clamp 15 via a 3-axis linear stage 40 may be driven to immerse the target mold 10 in the supporting liquid 20 through the coating material 25.

Next, the target mold 10 surrounded by the coating material 25 is gently shaken in the supporting liquid 20 (S140).

Figure 5:
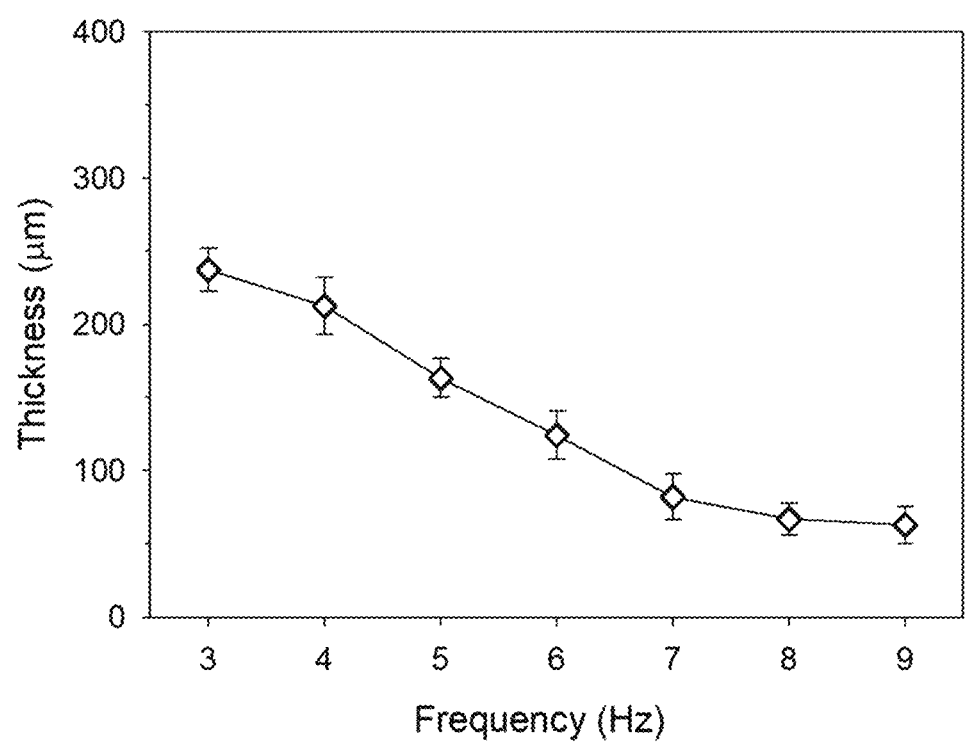
FIG. 5 is a graph showing a relationship of a linear reciprocating frequency of a target mold and a thickness of a coated film.

The 3-axis linear stage 40 is provided on the top of the target mold 10 to generate a vibration. The 3-axis linear stage 40 may be connected to an end of a stainless steel post extending to one axis of the clamp 15. If the target mold 10 is vibrated in the 3 axes by using this 3-axis linear stage 40, the coating material formed on the part in which the bending is severe may be removed to form a uniform coating film (See FIG. 4B). At this time, the thickness of the coated film may be controlled by controlling the frequency. Referring to FIG. 5, it may be confirmed that as the frequency increases, the thickness of the coated film becomes thinner. A motor may be connected to the clamp 15 connected to the target mold 10 to be rotated, thereby rotating the target mold 10 in the supporting liquid 20.

Next, the coating material 25 surrounding the target mold 10 is cured in the supporting liquid 20 (S150).

When the target mold 10 is surrounded by a thermally curable coating material, the thermally curable coating material may be cured by applying heat. When the target mold 10 is surrounded by a photocurable coating material, the photocurable coating material may be cured by irradiating light.

Next, the target mold 10 on which a coating film 25a is formed is taken out from the supporting liquid 20 (S160).

After taking it out, if the supporting liquid 20 is removed from the target mold 10 on which the coating film 25a is formed, the dip-coating process is completed.

Figure 6A:
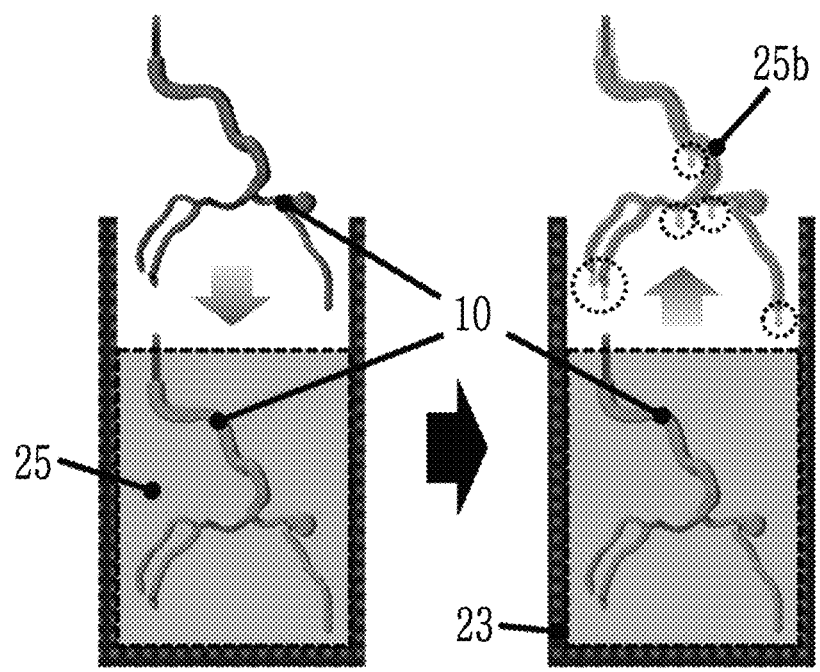
FIG. 6A is a process diagram showing a conventional dip-coating method.
Figure 6B:
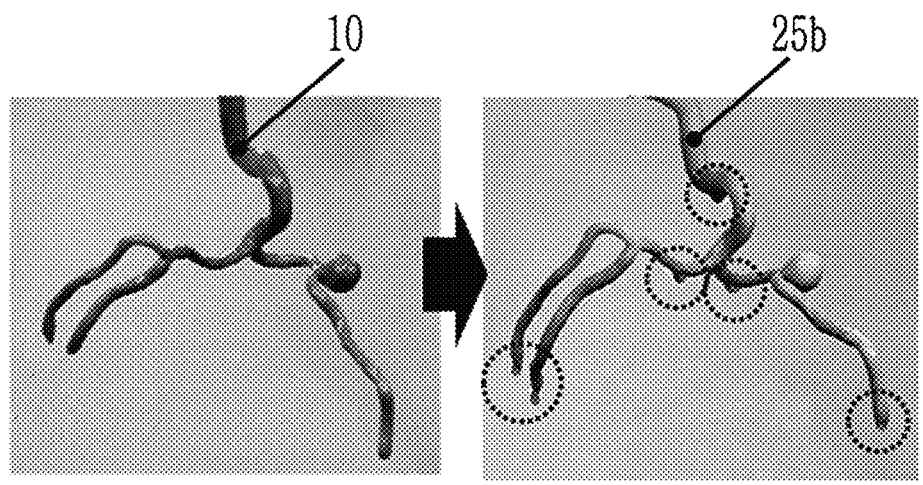
FIG. 6B is a view showing a resulting material.

FIG. 6A is a process diagram showing a conventional dip-coating method, and FIG. 6B shows a resulting material. As shown in FIG. 6A, in the conventional dip-coating method without the supporting liquid, the liquid coating material 25 is prepared and poured into container 23, and the target mold 10 is immersed and taken out at a constant speed, and then is cured. For example, the target mold 10 may be cured in advance at 70° C. for a predetermined time. When coating in this way, as shown in FIG. 6B, the coating film 25b has a non-uniform thickness under the influence of gravity.

Figure 7:
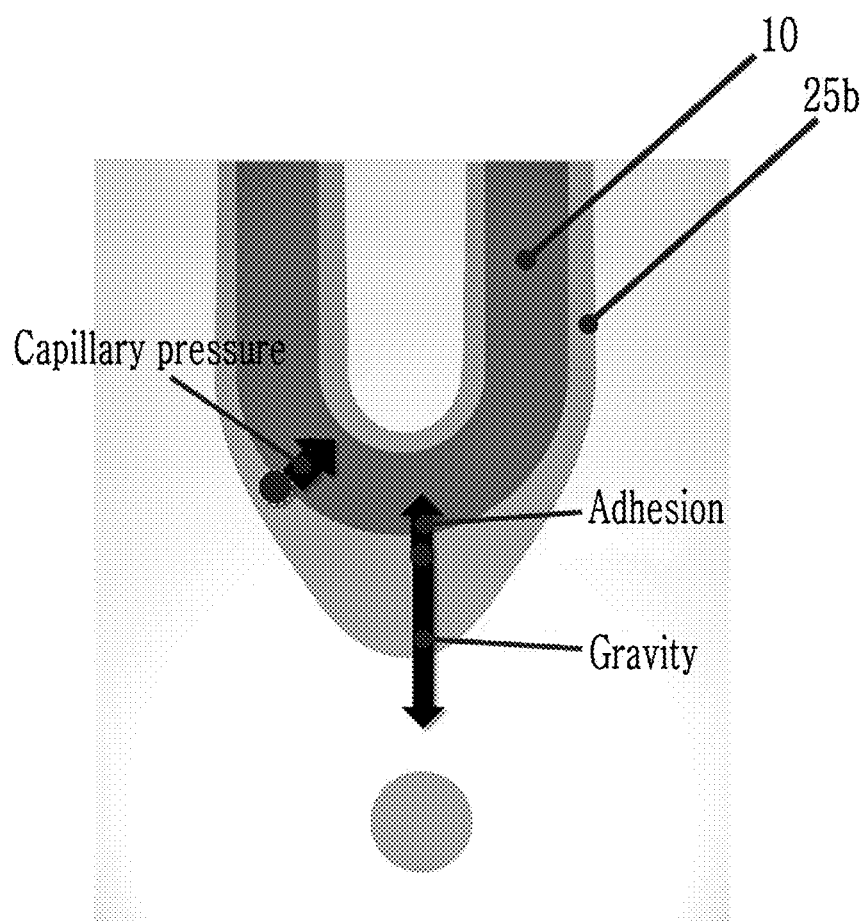
FIG. 7 is a view showing a correlation between forces acting on a coating film when using a conventional dip-coating method.

FIG. 7 is a view showing a correlation between forces acting on a coating film when using a conventional dip-coating method.

Capillary pressure, adherence, and gravity act on the uncured coating material 25 applied to the target mold 10. At this time, while the force of gravity acts larger than the other two forces, the net force is directed toward the direction of gravity, and as a result, as shown in FIG. 7, sagging occurs in the uncured coating material 25. Thus, a coating film 25b has a non-uniform thickness.

Figure 8:
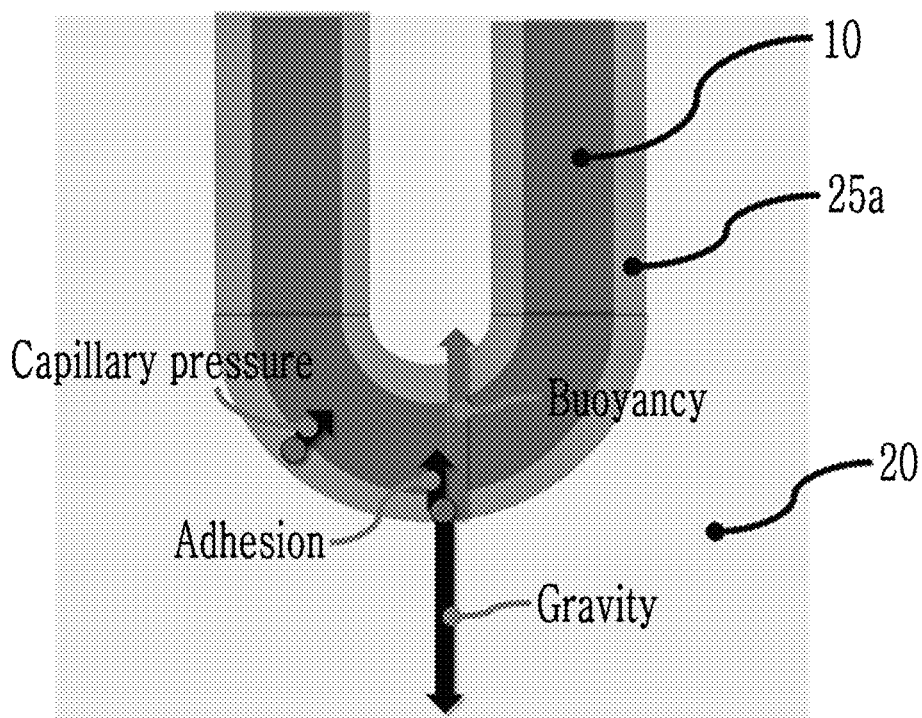
FIG. 8 is a view showing a correlation between forces acting on a coating film when using the dip-coating method according to the present exemplary embodiment.

FIG. 8 is a view showing a correlation between forces acting on a coating film when using the dip-coating method according to the present exemplary embodiment.

Since the supporting liquid 20 is used in the dip-coating method according to the present exemplary embodiment, in addition to the capillary pressure, the adherence, and gravity, buoyancy acts on the uncured coating material 25 applied to the target mold 10. In other words, as the buoyancy force acts in the opposite direction of gravity, the net force becomes close to zero while forming an approximate equilibrium with gravity. Therefore, the uncured coating material 25 may form the coating film 25a of a uniform thickness on the surface of the target mold 10 without sagging.

Figure 9B:
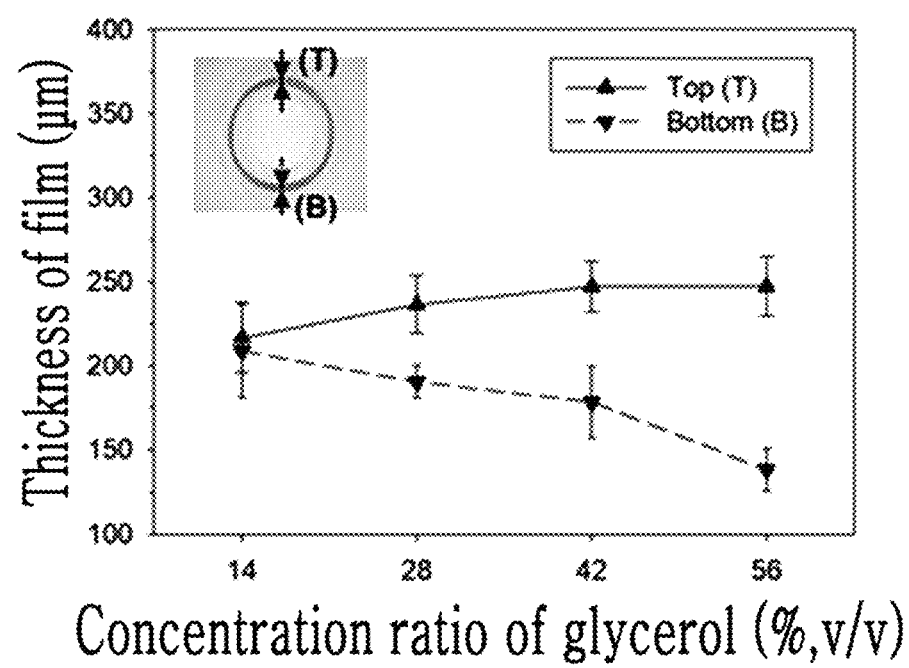
FIG. 9B is a graph showing a relationship of a concentration ratio of glycerol and a thickness of a coated film.

FIG. 9A shows one example of a shape of a coating film according to a concentration ratio of glycerol to determine a supporting liquid used in a dip-coating method according to the present exemplary embodiment, and FIG. 9B is a graph showing a relationship of a concentration ratio of glycerol and a thickness of a coated film.

Referring to FIG. 9A and FIG. 9B, when the density of the supporting liquid and the coating a solution are the same, the buoyant force acting on the coating film forms the equilibrium with gravity. For example, since the density of the supporting fluid containing 14% (v/v) glycerol is similar to that of polydimethylsiloxane used as the coating solution, the up and down thickness deviation of the coated film in the supporting liquid is about 8 µm and is small as about 4% of the thickness. However, for the thickness of the coated film on the supporting liquid 20 having the density greater than that of the coating solution, for example the supporting liquid respectively containing 28, 42, and 56% (v/v) glycerol, the top is thicker than the bottom.

Figure 10A:
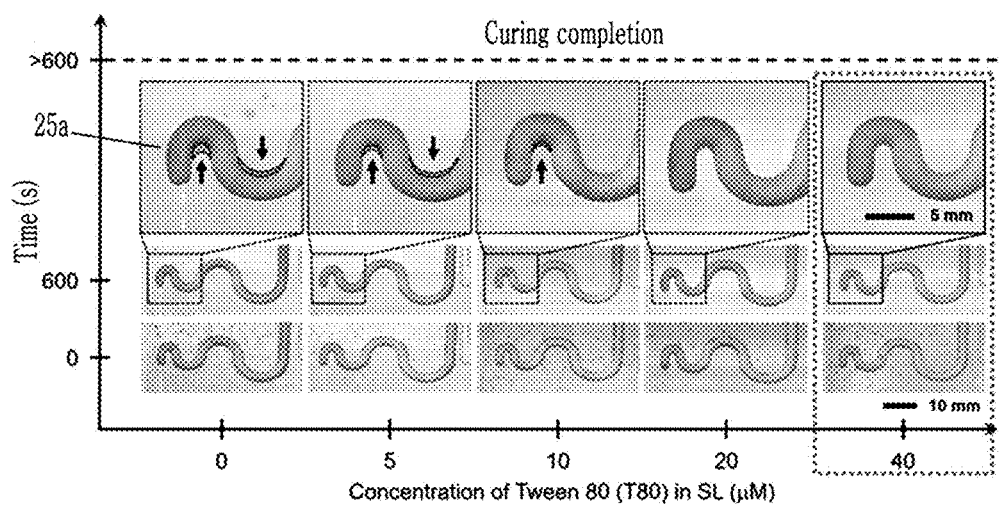
FIG. 10A shows one example of a shape of a coating film according to a concentration ratio of a surfactant to determine a supporting liquid used in a dip-coating method according to the present exemplary embodiment.
Figure 10B:
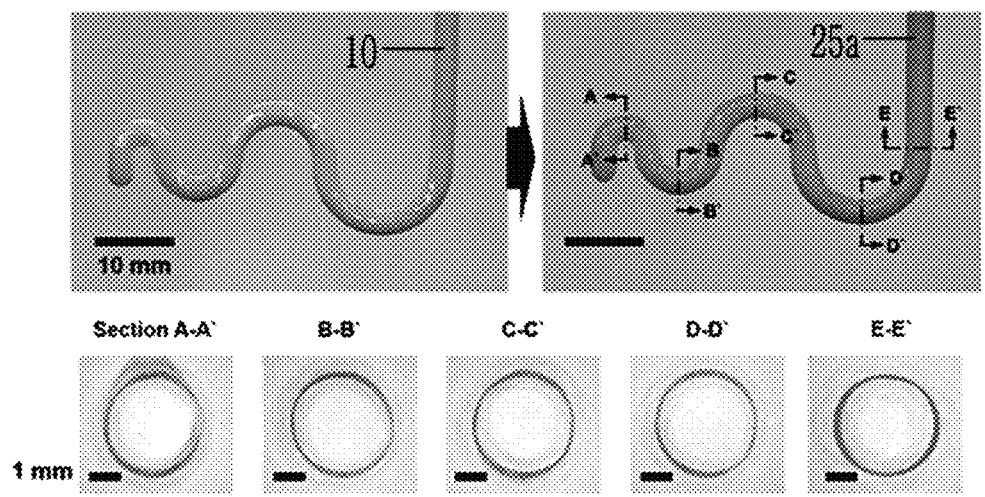
FIG. 10B shows one example of a shape of a coating film according to a curvature radius of a mold.

FIG. 10A shows one example of a shape of a coating film according to a concentration ratio of a surfactant to determine a supporting liquid used in a dip-coating method according to the present exemplary embodiment, FIG. 10B shows one example of a shape of a coating film according to a curvature radius of a mold, and FIG. 10O is a graph showing a relationship of a curvature radius of a mold and a thickness of a coated film.

Figure 10C:
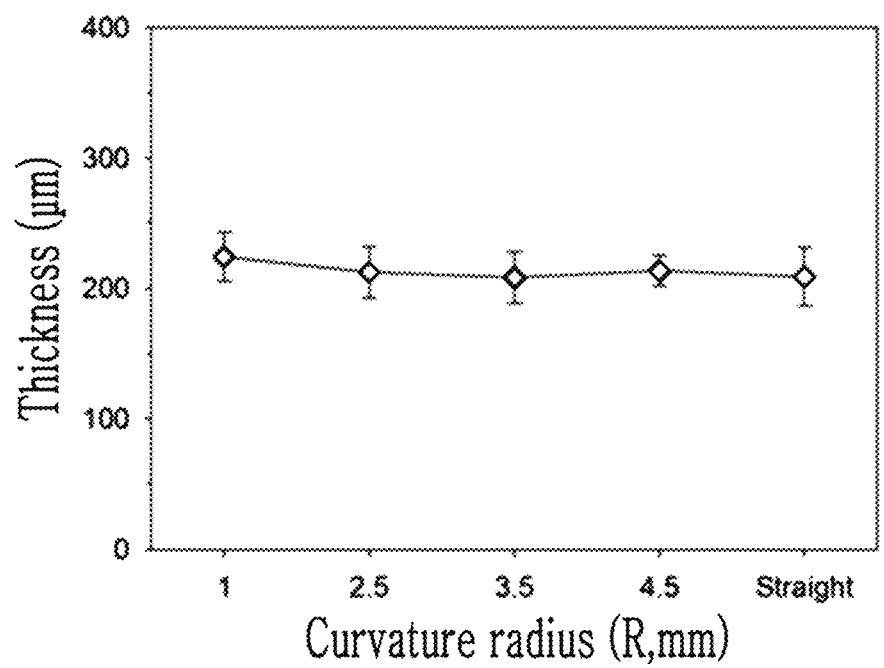
FIG. 10O shows a graph of a relationship of a curvature radius of a mold and a thickness of a coated film.

Referring to FIGS. 10A-10C, as the concentration ratio of Tween80® as the surfactant increases, the interface tension between the supporting liquid and the coating material decreases, and the capillary pressure generated in the portion where the curvature is disposed becomes weaker (See FIG. 10A). When the concentration ratio of Tween80® is saturated above 10 µM and the curvature radius of the mold is 1, 2.5, 3.5 and 4.5 mm, the coated film does not vary significantly in thickness (See FIGS. 10B and 10C).

FIG. 11 is a flowchart showing a method for fabricating a hollow tube by using a dip-coating method according to another exemplary embodiment of the present invention, and FIGS. 12A-12D show images of a target mold and a hollow artificial blood vessel model at each step to explain a method of fabricating a hollow tube, for example a hollow artificial blood vessel model, by using a dip-coating method according to another exemplary embodiment of the present invention.

Referring to FIG. 11, step S210 to step S260 are the same as the dip-coating method described with reference to FIG. 1. That is, the supporting liquid 20 is prepared and put into the container 23 (S210), the coating material 25, for example polydimethylsiloxane, is applied to the target mold 10 (S220), and the target mold 10, for example, the artificial blood vessel model mold produced by using the 3D printer, is immersed in the supporting liquid 20 (S230) (See FIG. 12A).

Figure 12A:
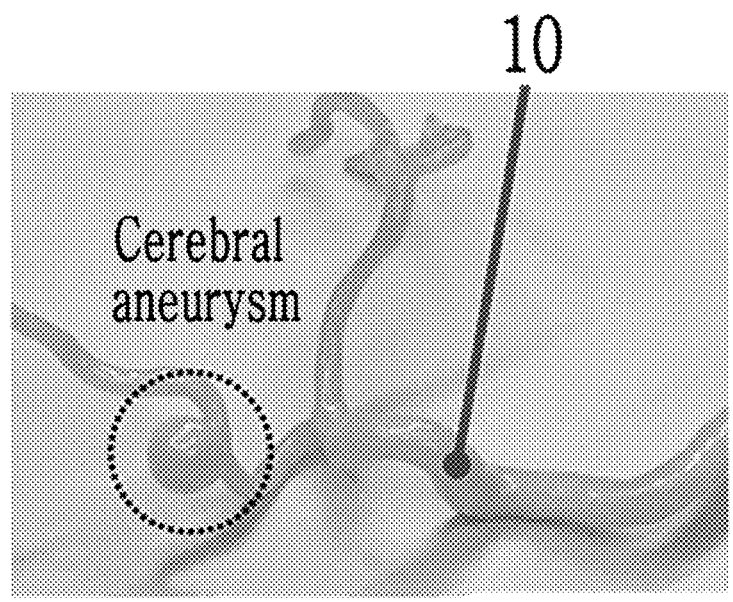
FIGS. 12A through 12D show images of a target mold and a hollow artificial blood vessel model at each step to explain a method of fabricating a hollow tube, for example a hollow artificial blood vessel model, by using a dip-coating method according to another exemplary embodiment of the present invention.
Figure 12B:
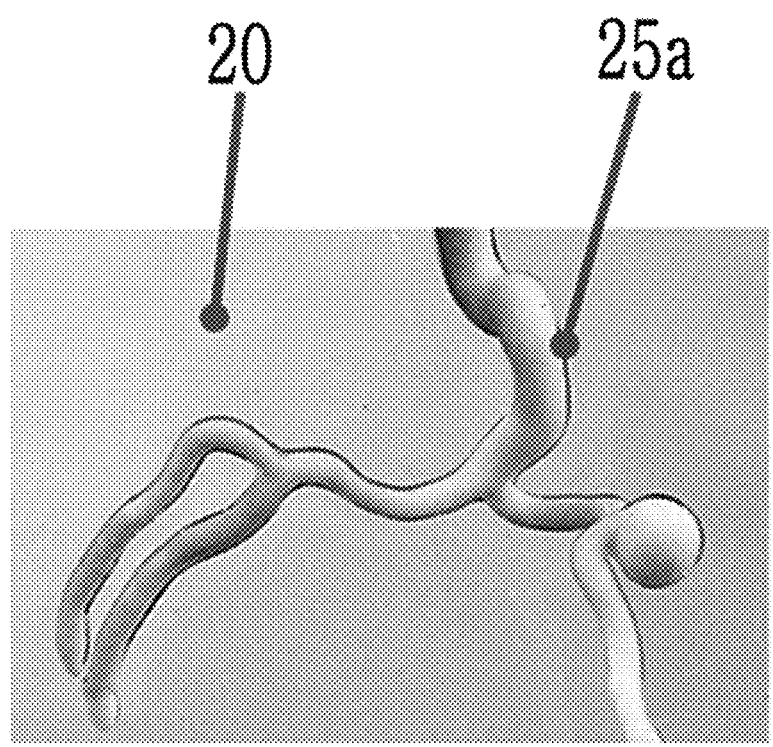
Figure 12C:
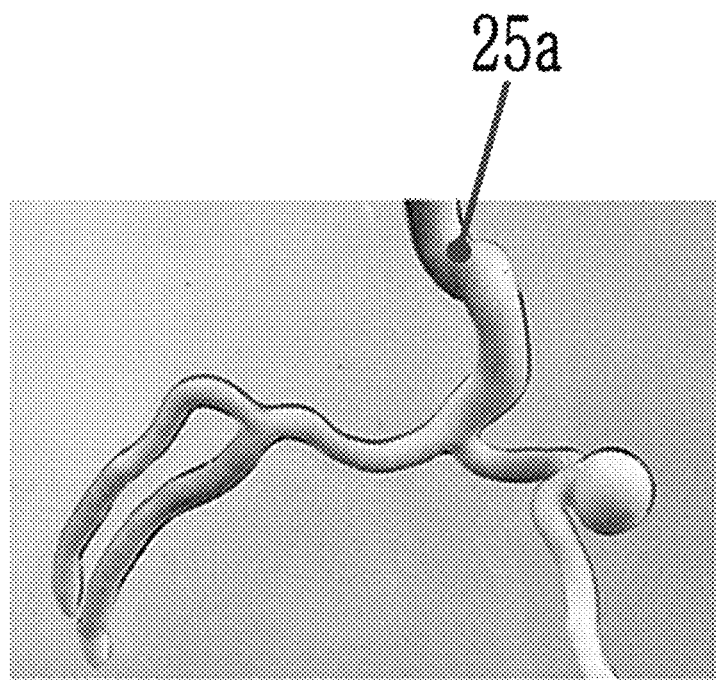

Then, the target mold 10 surrounded by the coating material 25 and is gently shaken in the supporting liquid 20 (S240), the coating material 25 surrounding the target mold 10 is cured in the supporting liquid 20 (S250, See FIG. 12B), and the target mold 10 on which the coating film 25a is formed is taken out from the supporting liquid 20 (S260, See FIG. 12C).

Next, the target mold 10 inside the coating film 25a is removed (S270). For example, when the target mold 10 is acrylonitrile butadiene styrene, acetone may be used, and in the case of polylactic acid, the target mold 10 may be removed through chloroform, benzene, and other chlorinated organic solvents.

Figure 12D:
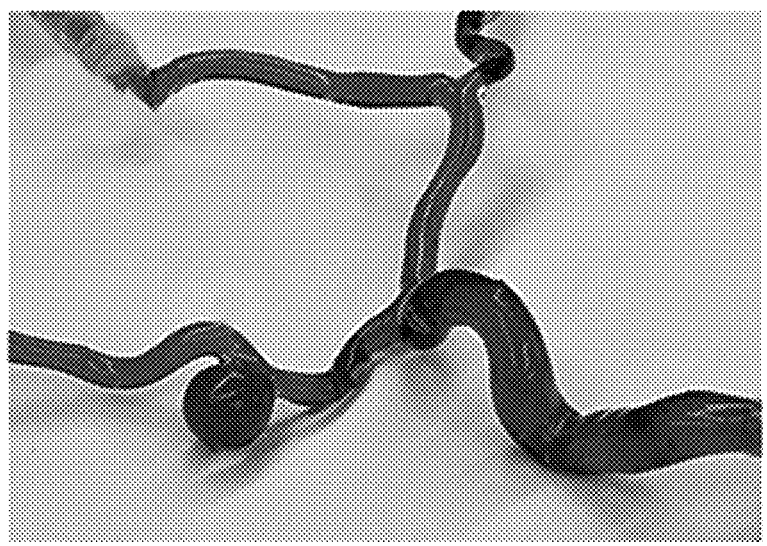

When the target mold 10 is removed in this way, and a hollow tube is manufactured with the remaining coating film 25a (S280, See FIG. 12D).

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A dip-coating method as a method for coating an outer surface of a target mold, comprising steps of:
    preparing and putting a supporting liquid in a container;
    applying a coating material to the target mold;
    dipping the target mold in the supporting liquid;
    shaking the target mold surrounded by the coating material in the supporting liquid;
    curing the coating material surrounding the target mold in the supporting liquid; and
    taking out the coated target mold from the supporting liquid.

2. The dip-coating method of claim 1, wherein
    the preparing and putting the supporting liquid in the container further includes pouring the coating material onto the supporting liquid, and
    the dipping the target mold in the supporting liquid further include immersing the target mold in the supporting liquid through the coating material.

3. The dip-coating method of claim 1, wherein
    the applying the coating material to the target mold further includes preparing and putting the coating material in a separate container from the supporting liquid, immersing the target mold in the coating material and taking the target mold out, and then again immersing the target mold in the supporting liquid.

4. The dip-coating method of claim 1, wherein
    the supporting liquid is formed of a material that does not react with or is not mixed with the coating material.

5. The dip-coating method of claim 1, wherein
    a density of the supporting liquid is equal to or larger than a density of the coating material.

6. The dip-coating method of claim 1, wherein
    an interface tension between the supporting liquid and the coating material is 5 mN/m to 30 mN/m.

7. The dip-coating method of claim 1, wherein
    the supporting liquid includes water, glycerol, and a surfactant.

8. The dip-coating method of claim 1, further comprising
    vibrating the target mold by using a 3-axis linear stage to remove the coating material formed at a portion.

9. The dip-coating method of claim 1, further comprising
    rotating the target mold to remove the coating material formed at a portion.

10. The dip-coating method of claim 1, wherein
    the curing the coating material surrounding the target mold in the supporting liquid includes applying heat to the coating material to be cured.

11. The dip-coating method of claim 1, wherein
    the curing the coating material surrounding the target mold in the supporting liquid includes irradiating light to the coating material to be cured.

12. A fabricating method of a hollow tube, comprising steps of:
    preparing the coated target mold by using a dip-coating method comprising steps of:
        preparing and putting a supporting liquid in a container;
        applying a coating material to the target mold;
        dipping the target mold in the supporting liquid;
        shaking the target mold surrounded by the coating material in the supporting liquid;
        curing the coating material surrounding the target mold in the supporting liquid; and
        taking out the coated target mold from the supporting liquid; and
    removing the target mold in a coating film; and manufacturing a hollow tube with the remaining coating film.

13. The fabricating method of a hollow tube of claim 12, wherein the preparing and putting the supporting liquid in the container further includes pouring the coating material onto the supporting liquid, and the dipping the target mold in the supporting liquid further include immersing the target mold in the supporting liquid through the coating material.

14. The fabricating method of a hollow tube of claim 12, wherein the applying the coating material to the target mold further includes preparing and putting the coating material in a separate container from the supporting liquid, immersing the target mold in the coating material and taking the target mold out, and then again immersing the target mold in the supporting liquid.

15. The fabricating method of a hollow tube of claim 12, wherein the supporting liquid is formed of a material that does not react with or is not mixed with the coating material.

16. The fabricating method of a hollow tube of claim 12, wherein a density of the supporting liquid is equal to or larger than a density of the coating material.

17. The fabricating method of a hollow tube of claim 12, wherein an interface tension between the supporting liquid and the coating material is 5 mN/m to 30 mN/m.

18. The fabricating method of a hollow tube of claim 12, wherein the supporting liquid includes water, glycerol, and a surfactant.

19. The fabricating method of a hollow tube of claim 12, further comprising vibrating the target mold by using a 3-axis linear stage to remove the coating material formed at a portion.

20. The fabricating method of a hollow tube of claim 12, further comprising rotating the target mold to remove the coating material formed at a portion.

\* \* \* \* \*